Patented Nov. 9, 1926.

1,606,481

UNITED STATES PATENT OFFICE.

WILLIAM F. ROCHOW, OF PITTSBURGH, PENNSYLVANIA, ASSIGNOR TO HARBISON-WALKER REFRACTORIES COMPANY, OF PITTSBURGH, PENNSYLVANIA, A CORPORATION OF PENNSYLVANIA.

NEUTRAL REFRACTORY CEMENT.

No Drawing. Application filed January 20, 1923. Serial No. 614,046.

This invention relates to refractory materials. More particularly it relates to certain mixtures of dry refractory ingredients, capable of forming a neutral refractory mortar or cement upon the addition of water, suitable for use in building walls and structures of either basic, neutral, or acid bricks, which are adapted to be exposed to intense heat, molten metal, slag, etc.

One of the special objects and advantages of the present invention is to provide a dry powdered mixture of ingredients containing the proper proportions of each, intimately commingled, which can be shipped in the dry powdered state to the point of use, and there formed into mortar or cement of any desirable consistency simply by addition of a suitable amount of water.

Another object is to provide a mixture of dry powdered materials which will not separate from the liquid ingredient when mixed into a mortar. Other objects are to produce a mortar of uniform consistency, high degree of plasticity and tenacity, low in shrinkage, and of a neutral character so that it may be used with a wide variety of bricks and shapes. Other objects and advantages will appear to those familiar with the art from the following specification.

Heretofore it has been customary to lay walls of fire-clay and silica brick in furnace construction and the like, with a mortar of fire-clay. This is less resistant to heat, molten metal, slag, etc., than the bricks themselves, and therefore it frequently happens that the mortar is eaten out by the molten contents of the furnace or structure, and therefore the wall fails before the bricks themselves have been injured.

I have found that a good mortar for such use may be made by intimately mixing a suitable aluminum oxide material, such as diaspore, or bauxite, with dry powdered sodium silicate, a small amount of dextrine, and a suitable amount of water to make the mortar of the desired consistency. The dry powdered materials may be mixed in a finely divided state, and this mixture shipped from the point of manufacture to any desired place, the water being added as mortar is required by workmen at the point of construction. By this means freight cost is reduced, a mortar of uniform mixture is assured, and the mixing of the mortar may be left to comparatively unskilled workmen.

The diaspore or bauxite is ground very fine by any suitable machinery. With this powdered material there is then mixed about seven and one half percent of dry sodium silicate in the form of fine powder. The two are intimately and thoroughly mixed together. I prefer to add, and mix with the foregoing ingredients a small amount of dextrine, say from one to five percent, and in most cases about one percent. This is mixed in the dry state with the other powdered ingredients before any water is added.

When a refractory mortar or cement is to be made up, the dry composition of ingredients above described is diluted with about eighteen percent of water and stirred until a uniform consistency is obtained. It is then used as ordinary mortar for laying bricks or shapes, or for any other uses to which a refractory cement is adapted.

Diaspore and bauxite in their natural state contain a material amount of water. This is driven off by heat, with consequent shrinkage. To avoid this, I prefer to calcine the diaspore or bauxite before grinding and mixing with the other ingredients. It is desirable, however, to use a small amount of the material in its natural uncalcined state, as it is then a good binder for the whole mortar, whereas the calcined material is not tenacious.

The mortar is of a substantially neutral composition, and is therefore not readily attacked by either slags or metals, and will ordinarily outlast fire bricks. Its shrinkage after calcining of the greater portion of the material is low, and consequently it does not tend to fall out or wear away between the bricks. The motar prepared as directed has a high degree of tenacity, and therefore sticks readily to fire bricks. It sets in a few hours, becoming very hard, and has a comparatively high tensile and compressive strength even at high temperatures. Its melting point is higher than that of commercial fire-clay or silica brick, and consequently the cement does not become soft and rub out of such brick work, even when exposed to high operating temperature.

The function of the dextrine in the mixture is to prevent the calcined powdered materials from settling in the mortar, that is to say from separating from the water. The mall amount of dextrine distributed through the dry powdered mixture dissolves when water is added, and forms a kind of pastry matrix which tends to maintain the uniform plasticity and consistency of the mortar. In effect is keeps all the solids in suspension. In addition the dextrine tends to prevent the soaking out of the water from the mortar into the dry bricks, to which it may be applied. Those familiar with the art will readily recognize that this is a distinct advantage in securing proper setting and bonding.

Bauxite is chemically a hydrated aluminum oxide, containing more than one molecule of water to each molecule of alumina. It is widely distributed in natural state, is highly refractory, and is of substantially neutral chemical property. Diaspore which is the form of hydrated aluminum oxide which I prefer to use is chemically very similar to bauxite, except that it is of a crystalline structure, and more hard and dense. It contains only one molecule of water for each molecule of alumina. When ground very fine and made into a mortar it is quite plastic, as is also bauxite, and both of these materials are peculiarly adapted to form a tenacious refractory mortar suitable for laying fire walls and structures. When calcined, however, this plasticity is largely lost, and it is for that reason that I prefer to use a portion of the diaspore or bauxite its natural state, calcining the remainder to remove the shrinkage therefrom. The mortar so prepared has very little shrinkage even at high temperature.

I claim:

1. A refractory composition comprising an intimate mixture of a powdered aluminum oxide and powdered sodium silicate.

2. A refractory composition comprising an intimate mixture of powdered aluminum oxide, powdered sodium silicate, and powdered dextrine.

3. A mortar composed of powdered aluminum oxide, dextrine, sodium silicate, and water.

4. A composition for making refractory mortar comprising calcined diaspore, sodium silicate, and dextrine powdered and intimately mixed.

5. A composition for making refractory mortar comprising calcined diaspore, uncalcined diaspore, sodium silicate, and dextrine, powdered and intimately mixed.

6. A cement comprising diaspore and an alkali silicate.

7. A cement comprising diaspore and sodium silicate.

In testimony whereof, I sign my name.

WILLIAM F. ROCHOW.